United States Patent
Chen et al.

(10) Patent No.: US 12,004,208 B2
(45) Date of Patent: *Jun. 4, 2024

(54) METHOD, TERMINAL, AND NETWORK DEVICE FOR DOWNLINK DATA TRANSMISSION BASED ON SCHEDULING OF PHYSICAL DOWNLINK SHARED CHANNELS (PDSCHS)

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 72 days.

This patent is subject to a terminal disclaimer.

(21) Appl. No.: 17/840,179

(22) Filed: Jun. 14, 2022

(65) Prior Publication Data

US 2022/0312431 A1 Sep. 29, 2022

Related U.S. Application Data

(63) Continuation of application No. 17/391,533, filed on Aug. 2, 2021, now Pat. No. 11,395,312, which is a (Continued)

(51) Int. Cl.
*H04W 74/00* (2009.01)
*H04J 14/02* (2006.01)
(Continued)

(52) U.S. Cl.
CPC ......... *H04W 72/54* (2023.01); *H04J 14/0213* (2013.01); *H04L 5/02* (2013.01);
(Continued)

(58) Field of Classification Search
CPC . H04W 74/00; H04W 72/54; H04W 74/0866; H04W 72/232; H04W 74/002;
(Continued)

(56) References Cited

U.S. PATENT DOCUMENTS 11,395,312 B2 * 7/2022 Chen ................... H04B 7/0408
2019/0349964 A1 * 11/2019 Liou ..................... H04W 76/27
(Continued)

FOREIGN PATENT DOCUMENTS

CN  105325029 A  2/2016
CN  108092754 A  5/2018

OTHER PUBLICATIONS

3GPP, "TS 38.214 v15.4.0" Dec. 2018, pp. 1-102 (Year: 2018).*
(Continued)

*Primary Examiner* — Salvador E Rivas
(74) *Attorney, Agent, or Firm* — Hodgson Russ LLP

(57) ABSTRACT

A method for downlink data transmission and related products are provided. The method includes: a terminal receives downlink control information (DCI) for scheduling multiple physical downlink shared channels (PDSCHs), wherein the DCI contains transmission configuration indicator (TCI) state indication; and the terminal determines a TCI state which is applied to each of the multiple PDSCHs according to at least one TCI state indicated by the TCI state indication.

20 Claims, 8 Drawing Sheets

Related U.S. Application Data continuation of application No. PCT/CN2019/075232, filed on Feb. 15, 2019.

(51) Int. Cl.
  *H04L 5/02* (2006.01)
  *H04W 28/02* (2009.01)
  *H04W 48/12* (2009.01)
  *H04W 72/0446* (2023.01)
  *H04W 72/23* (2023.01)
  *H04W 72/54* (2023.01)
  *H04W 74/08* (2009.01)
  *H04L 9/32* (2006.01)
  *H04L 25/02* (2006.01)
  *H04W 16/14* (2009.01)
  *H04W 76/27* (2018.01)

(52) U.S. Cl.
  CPC ....... *H04W 28/0263* (2013.01); *H04W 48/12* (2013.01); *H04W 72/0446* (2013.01); *H04W 72/23* (2023.01); *H04W 74/002* (2013.01); *H04W 74/0866* (2013.01); *H04L 9/3215* (2013.01); *H04L 25/0204* (2013.01); *H04W 16/14* (2013.01); *H04W 76/27* (2018.02)

(58) Field of Classification Search
  CPC .. H04W 48/12; H04W 16/14; H04L 12/40065
  See application file for complete search history.

(56) References Cited

U.S. PATENT DOCUMENTS

| | | | |
|---|---|---|---|
| 2020/0107353 A1* | 4/2020 | Jung | H04B 7/0689 |
| 2020/0280416 A1* | 9/2020 | Gao | H04L 27/2613 |
| 2020/0337058 A1* | 10/2020 | Song | H04W 72/53 |
| 2021/0314927 A1* | 10/2021 | Noh | H04L 5/0053 |

OTHER PUBLICATIONS

EPO, Office Action for EP Application No. 19915429.5, dated Sep. 23, 2022.
CNIPA, First Office Action for CN application No. 202110915886.2, dated Sep. 14, 2022.
Xiaomi, "Enhancements on Multi-TRP/Panel Transmission," 3GPP TSG RAN WG1 Ad-Hoc Meeting 1901, R1-1900841, Jan. 2019.
Panasonic, "On multi-TRP enhancements for NR MIMO in Rel. 16," 3GPP TSG RAN WG1 Ad-Hoc Meeting 1901, R1-1900677, Jan. 2019.
NTT Docomo, Inc, "Enhancements on multi-TRP/panel transmission," 3GPP TSG RAN WG1 Ad-Hoc Meeting 1901, R1-19000978, Jan. 2019.
JPO, Office Action for JP Application No. 2021-545931, dated Jan. 6, 2023.

* cited by examiner

DCI indication {TCI state 0,TCI state 1}

METHOD, TERMINAL, AND NETWORK DEVICE FOR DOWNLINK DATA TRANSMISSION BASED ON SCHEDULING OF PHYSICAL DOWNLINK SHARED CHANNELS (PDSCHS)

CROSS REFERENCE TO RELATED APPLICATION(S)

This application is a continuation of U.S. patent application Ser. No. 17/391,533, filed Aug. 2, 2021, which is a continuation of International Application No. PCT/CN2019/075232, filed Feb. 15, 2019, the entire disclosures of which are incorporated herein by reference.

TECHNICAL FIELD

This disclosure relates to the field of communication technology, in particular to methods for downlink data transmission and related products.

BACKGROUND

At present, the transmission configuration indicator (TCI) state indication field in downlink control information (DCI) in a wireless communication system can only indicate a limited number of TCI states, the number of physical downlink shared channel (PDSCH) repetition, on the other hand, can be large. The terminal is unable to determine which TCI state is used for PDSCH reception for each of multiple PDSCHs carrying the same data and therefore, the expected diversity gain cannot be obtained.

SUMMARY

According to a first aspect, a method for downlink data transmission is provided. The method includes: receiving, by a terminal, DCI for scheduling multiple PDSCHs, where the DCI contains TCI state indication; and determining, by the terminal, a TCI state which is applied to each of the multiple PDSCHs according to at least one TCI state indicated by the TCI state indication.

According to a second aspect, a terminal is provided. The terminal has functions of realizing the behavior of the terminal in the above method design. The functions can be realized by hardware or by executing corresponding software with hardware. The hardware or software includes one or more modules corresponding to the above functions. In one possible design, the terminal includes a processor, which is configured to enable the terminal to perform the corresponding functions in the above method. The terminal may further include a transceiver, which is configured to enable communication between the network device and the terminal. The terminal may further include a memory, which is coupled with the processor and configured to store necessary program instructions and data for the terminal.

According to a third aspect, a computer readable storage medium is provided. The computer readable storage medium is configured to store computer programs for electronic data interchange, where the computer programs are operable with a computer to perform all or part of the steps of the method of the first aspect.

BRIEF DESCRIPTION OF THE DRAWINGS

The following will briefly introduce the drawings to be used in the description of the application or the related art.

DETAILED DESCRIPTION

Technical solutions in implementations of the disclosure will now be described in combination with the drawings.

Figure 1A:
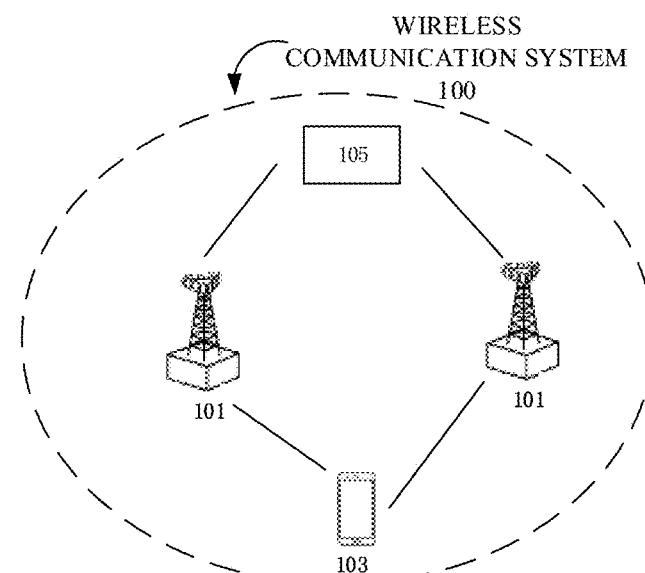
FIG. 1a is a diagram illustrating a system architecture of a wireless communication system provided in implementations of the disclosure.

FIG. 1a illustrates a wireless communication system. The wireless communication system is operable at a high frequency band, and can be a future evolution of the 5th generation (5G) system, a new radio (NR) system, a machine to machine (M2M) system, etc. As illustrated in FIG. 1a, the wireless communication system 100 may include one or more network devices 101, one or more terminals 103, and a core network (CN) device 105. The network device 101 may be a base station, which can communicate with one or more terminals, or communicate with one or more base stations having some terminal functions, such as communication between a macro base station and a micro base station (such as an access point (AP)). The base station may be a base transceiver station (BTS) in a time division synchronous code division multiple access (TD-SCDMA) system, an evolutional Node B (eNB) in a long-term evolution (LTE) system, or a gNB in the 5G system or NR system. The base station can also be an AP, a transmission point (TRP), a central unit (CU) or other network entities, and may has all or part of the functions of the above network entities. The CN device 105 includes CN side devices such as a serving gateway (SGW). The terminal

103 may be distributed across the entire wireless communication system 100, and may be stationary or mobile. In some implementations, the terminal 103 may be a mobile device such as a smart phone, a mobile station, a mobile unit, a M2M terminal, a wireless unit, a remote unit, a user agent, a user equipment (UE), a mobile client, etc.

The wireless communication system 100 illustrated in FIG. 1a is only for a clearer explanation of the technical solution of the disclosure, and does not constitute any limitation of the disclosure. With the evolution of network architecture and the emergence of new service scenarios, the technical solution provided herein is also applicable to similar technical problems.

The related technologies involved in the disclosure are described below.

Figure 1B:
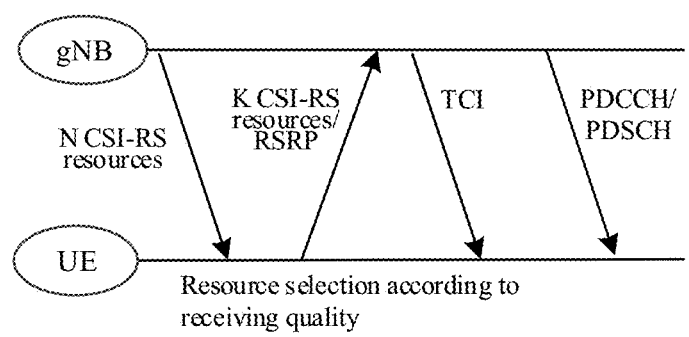
FIG. 1b is a diagram illustrating a process of downlink beam management provided in implementations of the disclosure.

At present, in a NR system design, such as the downlink (DL) beam management process illustrated in FIG. 1B, the network device can use an analog beam to transmit PDSCH. In FIG. 1B, a channel state information reference signal (CSI-RS) is taken as an example, and "RSRP" refers to reference signal received power. Before analog beamforming, the network device needs to determine the beam to be used through the downlink beam management process. The downlink beam management can be based on CSI-RS or synchronization signal block (SSB). Specifically, the network device transmits multiple SSB resources or multiple CSI-RS resources for beam management, based on which the terminal can perform detection, select the SSB resource (s) or CSI-RS resource(s) with the best quality, and report the index of the SSB resource(s) selected or the index of CSI-RS resource(s) selected together with the corresponding RSRP to the network device. According to the report received from the terminal, the network device determines an optimal SSR resource or an optimal CSI-RS resource, and determines a transmit beam used by the optimal SSR resource or the optimal CSI-RS resource as a transmit beam for downlink transmission, to transmit downlink control channel or data channel. Before transmitting the downlink control channel or data channel, the network device will indicate a corresponding QCL reference signal to the terminal through a TCI state, such that the terminal can use a receiving beam previously used for receiving the QCL reference signal to receive a corresponding downlink control channel or data channel.

In the NR system, during downlink transmission of a QCI indication, the network device can configure a TCI state for each downlink signal or downlink channel to indicate a QCL reference signal corresponding to a target downlink signal or a target downlink channel, such that the terminal can receive the target downlink signal or the target downlink channel based on the QCL reference signal. One TCI state may further include: TCI state ID for identifying a TCI state; QCL information 1; QCL information 2, where QCL information may further include: QCL type, which may be one of Type A, Type B, Type C, or Type D; QCL reference signal configuration, including cell ID of a cell where the reference signal is located, band width part (BWP) ID, and reference signal ID (may be CSI-RS resource ID or SSB index). At least one of QCL information 1 and QCL information 2 should take the QCL type of Type A, Type B, or Type C, and the other one of QCL information 1 and QCL information 2 (if configured) should take the QCL type of Type D. Different QCL types are defined as follows:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

If the network device configures, through the TCI state, the QCL reference signal of the target downlink channel as the reference SSB resource or the reference CSI-RS resource, and the QCL type as Type A, Type B, or Type C, the terminal can assume that the target downlink signal has the same target large-scale parameter as the reference SSB resource or the reference CSI-RS resources, and thus can use the same corresponding receive parameter for receiving. The target large-scale parameter is determined according to the QCL type. Similarly, if the network device configures, through the TCI state, the QCL reference signal of the target downlink channel as the reference SSB resource or the reference CSI-RS resource, and the QCL type as Type D, the terminal can use a receive-beam, which is the same as that used for receiving the reference SSB resource or reference CSI-RS resource, for target downlink signal receiving. Generally, the target downlink channel and the reference SSB resource or reference CSI-RS resource thereof are transmitted by the same TRP, the same panel, or the same beam at the network device. If the TRP, the panel, or beam for transmission of two downlink signals or downlink channels are different, different TCI states are usually configured.

Figure 1C:
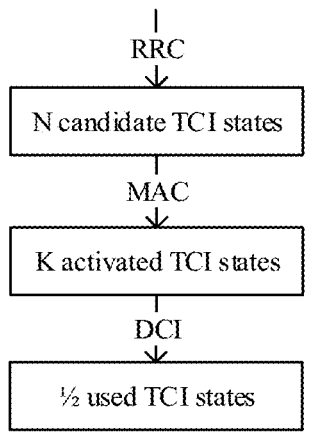
FIG. 1c is a diagram illustrating a TCI state configuration method for PDSCH.

For a downlink control channel, the TCI state can be indicated through radio resource control (RRC) signaling, or can be indicated through RRC signaling and media access control (MAC) signaling. For a downlink data channel, a set of available TCI states is indicated through RRC signaling, and some TCI states in the set are activated through MAC signaling. Finally, one or two TCI states are indicated from the activated TCI states through a TCI state indication field in DCI, and used for DCI scheduled PDSCH. In the TCI state configuration method for PDSCH in FIG. 1c, the network device indicates N TCI states through RRC signaling, indicates K activated TCI states through MAC signaling, and indicates one or two TCI states from the K activated TCI states through RRC signaling, where N and K are positive integers and N≥K.

Figure 1D:
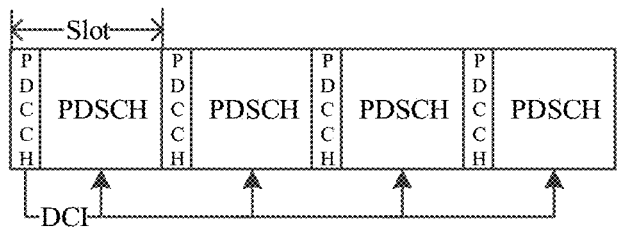
FIG. 1d is a diagram illustrating slot-based PDSCH repetition.
Figure 1E:
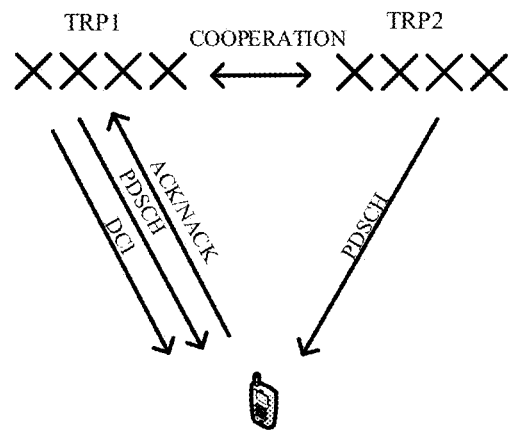
FIG. 1e is a diagram illustrating TRP-based PDSCH repetition.

In the NR system, in order to improve the transmission reliability of PDSCH, repetition of PDSCH is introduced, that is, PDSCHs carrying the same data are transmitted through different slots/TRPs/redundancy versions for many times, thus the diversity gain can be obtained and the probability of false detection (BLER) can be reduced. Specifically, PDSCH repetition can be transmitted across multiple slots (in FIG. 1d, slots and physical downlink control channel (PDCCH) are illustrated) or multiple TRPs (in FIG. 1e, Acknowledge/Non-Acknowledge (ACK/NACK) are illustrated). For multi-slot based repetition, one DCI can schedule PDSCHs carrying the same data to be transmitted across consecutive slots and use the same frequency domain resource. For multiple TRPs based repetition, PDSCHs carrying the same data are transmitted from different TRPs and use different beams, here, more than one TCI state is indicted in one DCI. The multi-TPR based repetition can be combined with the multi-slot based repetition, as such, PDSCH repetition is transmitted across consecutive slots, and at different slots, PDSCH repetition is transmitted from different TRPs.

At present, the TCI state indication field in DCI can only indicate very limited number of TCI states, the number of PDSCH repetition, on the other hand, can be large. The terminal is unable to determine which TCI state is used for PDSCH reception for each of multiple PDSCHs carrying the same data, and therefore the expected diversity gain cannot be obtained.

Taking the above into consideration, implementations of the disclosure are given below with reference to the accompanying drawings.

Figure 2:
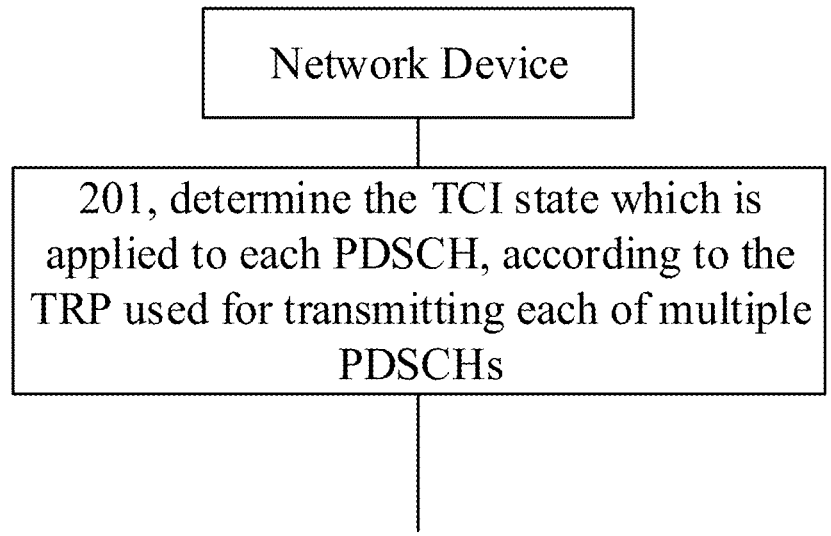
FIG. 2 is a schematic flowchart of a method for downlink data transmission.

FIG. 2 illustrates a method for downlink data transmission, which is applicable to the communication system given above. The method is implemented as follows.

At block 201, a network device determines a TCI state which is applied to (in other words, corresponds to) each of multiple PDSCHs according to at least one of a beam and a TRP used for transmitting each PDSCH.

The term "multiple PDSCHs" may refer to PDSCH repetitions, the term "the n-th PDSCH" in the multiple PDSCHs may refer to the n-th PDSCH repetition. The above definition is applicable to the whole disclosure and will not be repeated hereinafter. The TCI state can be determined according to the TRP, according to the beam, or according to the TRP and the beam.

After determining the TCI state which is applied to each PDSCH, the network device can: generate TCI state indication according to the TCI state which is applied to each PDSCH; generate, according to the TCI state indication, DCI for scheduling the multiple PDSCHs; transmit the DCI, the DCI is used for the terminal to determine the TCI state which is applied to each PDSCH from at least one TCI state indicated by the TCI state indication.

In one possible implementation, the method further includes: the network device transmits DCI for scheduling multiple PDSCHs, the DCI contains TCI state indication for indicating the TCI state which is applied to each PDSCH, and the multiple PDSCHs carry the same data.

The expression of "the multiple PDSCHs carry the same data" may refer to that the multiple PDSCHs adopt the same HARQ process, or the multiple PDSCHs transmit the same transport block (TB). The above definition is applicable to the whole disclosure and will not be repeated hereinafter.

The term "same data" may refer to the same data source bit, that is, the data bits before channel coding are the same. The data bits after channel coding can be different.

As such, the terminal can determine the TCI state which is applied to each of multiple PDSCHs (or multiple repetitions of one PDSCH) transmitting the same data from multiple TCI states configured by the network device, and can switch flexibly between multiple TCI states. The communication system can obtain significant diversity gain with less signaling overhead, and the reliability of downlink PDSCH transmission can be improved.

In one possible implementation, in the multiple PDSCHs, PDSCHs transmitted by using different beams or by different TRPs correspond to different TCI states, and/or, PDSCHs transmitted by using a same beam or by a same TRP correspond to a same TCI state.

In one possible implementation, the multiple PDSCHs correspond to multiple TCI states.

In one possible implementation, after transmitting the DCI for scheduling the multiple PDSCHs, the method further includes: the network device transmits the multiple PDSCHs according to the beam or the TRP used for transmitting each of the multiple PDSCHs.

Accordingly, at the terminal side, after receiving the DCI, the terminal can determine the TCI state which is applied to each PDSCH according to the at least one TCI state indicated by the TCI state indication in the DCI, and further determine the correspondence between beams/TRPs, TCI states, and PDSCHs, to receive multiple PDSCHs.

Figure 3:
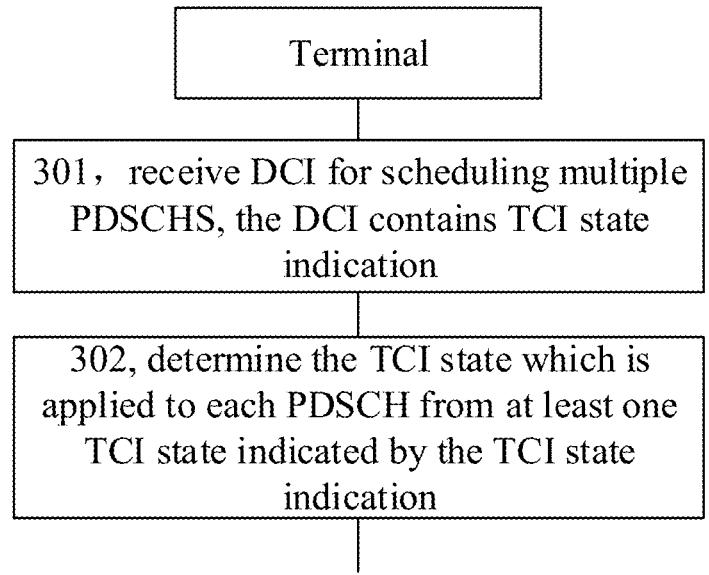
FIG. 3 is a schematic flowchart of another method for downlink data transmission.

FIG. 3 illustrates a method for downlink data transmission according to another implementation, which is applicable to the above communication system. The method includes the following.

At block 301, the terminal device receives DCI for scheduling multiple PDSCHs, where the DCI contains TCI state indication.

The DCI is generated at the network device side by: determining a TCI state which is applied to each of multiple PDSCHs according to at least one of a beam and a TRP used for transmitting each PDSCH; generating the TCI state indication according to the TCI state which is applied to each PDSCH; generating the DCI for scheduling the multiple PDSCHs according to the TCI state indication.

At block 302, the terminal determines the TCI state which is applied to each of the multiple PDSCHs from the at least one TCI state indicated by the TCI state indication.

In one possible implementation, the multiple PDSCHs carry the same data.

In one possible implementation, the multiple PDSCHs are transmitted across consecutive slots, across consecutive PDSCH transmission occasions, or in a single slot.

In one possible implementation, the multiple PDSCHs are transmitted based on at least one of: a same demodulation reference signal (DMRS) port, a same orthogonal frequency division multiplexing (OFDM) symbol, or a same modulation and coding scheme (MCS) and a same hybrid automatic repeat request (HARQ) process.

For example, the multiple PDSCHs are transmitted based on the same DMRS port, the same OFDM symbol, or the same MCS and the same HARQ process.

Alternatively, the multiple PDSCHs can be transmitted based on the same frequency domain resource.

In one possible implementation, the at least one TCI state is multiple TCI states.

In one possible implementation, the terminal determines the TCI state which is applied to each of the multiple PDSCHs from the at least one TCI state indicated by the TCI state indication as follows: the terminal determines the TCI state which is applied to each of the multiple PDSCHs from the at least one TCI state according to a rule agreed with a network device.

As such, according to the agreed rule, the terminal can determine the TCI state which is applied to each of the multiple PDSCHs carrying the same data (or multiple repetitions of one PDSCH) from multiple TCI states configured by the network device, since the rule is specified in the protocol, the terminal can determine the TCI state which is applied to each PDSCH without extra signaling overhead.

In one possible implementation, the number of the multiple PDSCHs is N, the number of the at least one TCI state is K, where N and K are positive integers.

In one possible implementation, the rule includes at least one of: the multiple PDSCHs are in one-to-one correspondence with the at least one TCI state, when N=K; the first N TCI sates in the at least one TCI state correspond to the N PDSCHs, and the N PDSCHs are in one-to-one correspondence with the first N TCI states, when N<K; the n-th PDSCH in the multiple PDSCHs corresponds to the k-th TCI state in the at least one TCI state, and k=[(n−1) mod K+1], when N>K; the n-th PDSCH in the multiple PDSCHs corresponds to the k-th TCI state in the at least one TCI state, and k=[n/m], when N=K*m and m is an integer greater than 1.

In this implementation, with aid of the rule agreed, on the one hand, the diversity gain of multiple TRPs or multiple beams can be obtained in the first few transmissions, so that the terminal can detect the PDSCH faster and reduce the delay of correct transmission; on the other hand, complexity of the terminal is taken into consideration, and the number of switching to receiving beam is reduced as much as possible.

In one possible implementation, the terminal determines the TCI state which is applied to each of the multiple PDSCHs from the at least one TCI state indicated by the TCI state indication as follows: the terminal determines the TCI state which is applied to each of the multiple PDSCHs from the at least one TCI state indicated by the TCI state indication according to an index sequence configured through higher layer signaling.

As such, according to the index sequence configured by the network device through higher layer signaling, the terminal can determine the TCI state which is applied to each of the multiple PDSCHs carrying the same data (or multiple repetitions of one PDSCH) from multiple TCI states configured by the network device and can switch flexibly between multiple TCI states, such that the communication system can obtain significant diversity gain with little signaling overhead, thus improving the reliability of downlink PDSCH transmission.

In one possible implementation, each index value in the index sequence is used to indicate an index of a TCI state in the at least one TCI state.

In one possible implementation, the index sequence has a length equal to the number of the multiple PDSCHs, and TCI states indicated by the index sequence are in one-to-one correspondence with the multiple PDSCHs. The terminal determines the TCI state which is applied to each of the multiple PDSCHs from the at least one TCI state according to the index sequence configured through higher layer signaling as follows: the terminal determines the TCI state which is applied to each of the multiple PDSCHs according to the TCI states indicated by the index sequence and the correspondence.

In one possible implementation, the index sequence has a length equal to the number of the at least one TCI state or equal to a fixed value, TCI states indicated by the index sequence correspond to the multiple PDSCHs circularly, or the first N TCI states in the TCI states indicated by the index sequence are in one-to-one correspondence with the multiple PDSCHs, where Nis the number of the multiple PDSCHs. The terminal determines the TCI state which is applied to each of the multiple PDSCHs from the at least one TCI state according to the index sequence configured through higher layer signaling as follows: the terminal determines the TCI state which is applied to each of the multiple PDSCHs according to the TCI states indicated by the index sequence and the correspondence.

In one possible implementation, the fixed value is 2.

In one possible implementation, the n-th PDSCH in the multiple PDSCHs corresponds to a TCI state with an index value m in the at least one TCI state, wherein m is the k-th index value in the index sequence, k=[(n−1) mod K+1], and K represents the length of the index sequence.

In one possible implementation, the terminal determines the TCI state which is applied to each of the multiple PDSCHs from the at least one TCI state indicated by the TCI state indication as follows: the terminal determines the TCI state which is applied to each of the multiple PDSCHs from the at least one TCI state according to a redundancy version configuration(s) of the multiple PDSCHs.

In this implementation, based on the redundancy version configuration used for PDSCH transmission, the terminal can determine the TCI state which is applied to each of the multiple PDSCHs carrying the same data (or multiple repetitions of one PDSCH) from multiple TCI states configured by the network device, since the redundancy version configuration is known to the terminal, the terminal can determine the TCI state which is applied to each PDSCH without extra signaling overhead.

In one possible implementation, the terminal determines the TCI state which is applied to each of the multiple PDSCHs from the at least one TCI state according to the redundancy version configuration(s) of the multiple PDSCHs as follows: the terminal determines an index sequence corresponding to redundancy version indication contained in the DCI according to the redundancy version indication, and determines the TCI state which is applied to each of the multiple PDSCHs from the at least one TCI state according to the index sequence; or the terminal determines the TCI state which is applied to each of the multiple PDSCHs according to a redundancy version used by each of the multiple PDSCHs and a correspondence between redundancy versions and TCI states.

In one possible implementation, the method further includes: the terminal detects the multiple PDSCHs according to the TCI state which is applied to each of the multiple PDSCHs.

In one possible implementation, the terminal detects the multiple PDSCHs according to the TCI state which is applied to each of the multiple PDSCHs as follows: the terminal detects each of the multiple PDSCHs by detecting large-scale parameters used by a quasi co-location (QCL) reference signal contained in the TCI state which is applied to each of the multiple PDSCHs, according to the QCL reference signal and a QCL type contained in the TCI state which is applied to each of the multiple PDSCHs, where the large-scale parameter is a large-scale parameter indicated by the QCL type.

Implementations of the disclosure will be described in combination with specific scenarios.

Figure 4A:
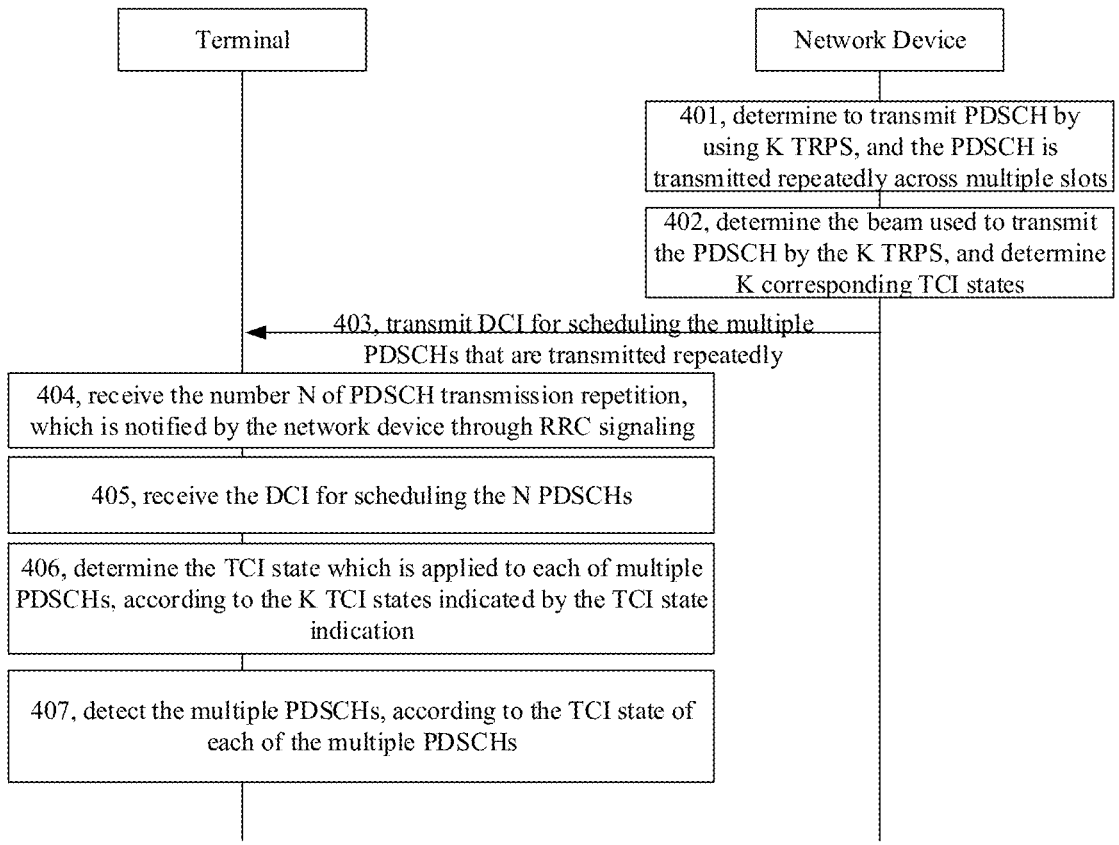
FIG. 4a is a schematic flowchart of another method for downlink data transmission.

FIG. 4a illustrates a method for downlink data transmission. The method is applicable to the above communication system and includes the following operations.

At block 401, the network device decides to transmit PDSCH with K TRPs, and repetition of the PDSCH is performed across multiple slots to improve transmission reliability. The number (N) of repetition is notified to the terminal through higher layer signaling, N=2, 4, 8, and K is a positive integer.

K=1 or K=2. The higher layer signaling can be RRC signaling.

At block 402, the network device determines a beam(s) used for transmitting the PDSCH by the K TPRs, and determines K TCI states, here, the TCI states can be determined according to the TRP.

At block 403, the network device transmits downlink DCI for scheduling multiple PDSCHs which are transmitted repeatedly. The DCI contains TCI state indication for indicating K TCI states, and the multiple PDSCHs carry the same data.

At block 404, the terminal receives the number (N) of PDSCH repetition which is notified by the network device through RRC signaling, the number N can be configured through RRC parameter pdsch-AggregationFactor.

At block 405, the terminal receivers the downlink DCI for scheduling the N PDSCHs, where the DCI contains TCI state indication for indicating the K TCI states.

The TCI state indication is for indicating the K TCI states form P TCI states indicated in advance by RRC signaling or MAC control element (CE), where P is an integer and P≥K.

In this implementation, it is assumed that the multiple PDSCHs are transmitted across consecutive slots. The multiple PDSCHs occupy the same physical resource across the consecutive slots. This implementation is also applicable to consecutive transmission occasions based PDSCH repetition.

The PDSCH can be transmitted based on the same scheduling information, such as the same number of transmission layers, the same DMRS port and DMRS location, the same frequency resource, the same OFDM symbol, or the same MCS and the same HARQ process.

At block 406, the terminal determines the TCI state which is applied to each of the multiple PDSCHs according to the K TCI states indicated by the TCI state indication.

In one implementation, the terminal determines the TCI state which is applied to each PDSCH from the K TCI states according to a rule agreed with the network device. The following will describe how to determine the TCI state which is applied to each PDSCH, with K=2. The number of multiple PDSCHs is N, and N=2, 4, 8, the index sequence corresponding to the K TCI states is {TCI state 0, TCI state 1}, that is, the indexes of the two TCI states are 0 and 1 respectively.

Figure 4B:
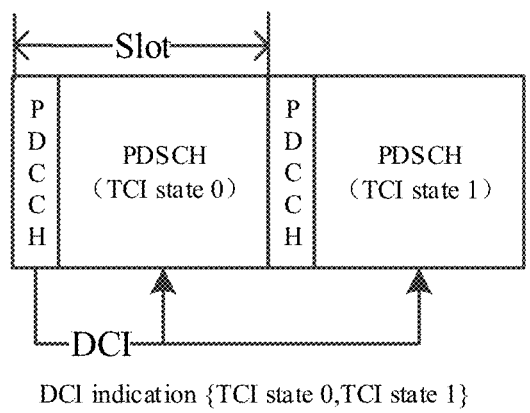
FIG. 4b is a diagram illustrating one-to-one correspondence-based TCI state determination.

Case 1: N=K=2, as illustrated in FIG. 4b, the two PDSCHs and the two TCI states are in one-to-one correspondence, that is, the first PDSCH of the two PDSCHs corresponds to the first TCI state in the two TCI states, and the second PDSCH of the two PDSCHs corresponds to the second TCI state in the two TCI states.

Case 2: N>K, the TCI state which is applied to each PDSCH can be determined in one of the following manners.

Manner 1: The K TCI states are circularly applied to the N PDSCHs as a whole. Specifically, the n-th PDSCH in the N PDSCHs corresponds to the k-th TCI state in the K TCI states, where k=[(n−1) mod K+1].

Figure 4C:
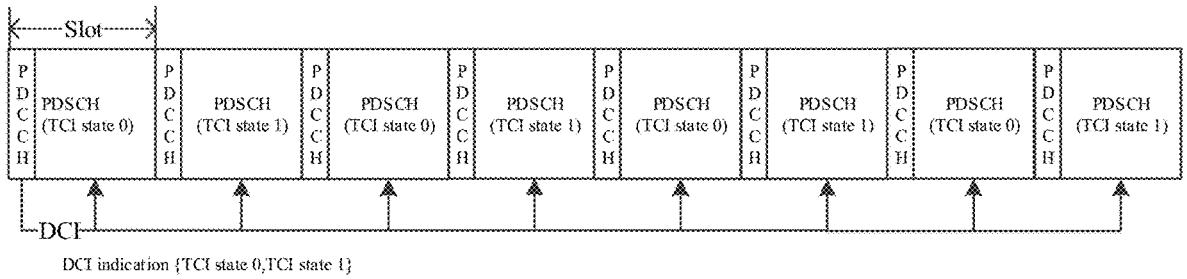
FIG. 4c is a diagram illustrating multi-slot repetition of PDSCH, where N=8.

For example, if N=2, then the index sequence of the TCI states corresponding to the two PDSCHs is {0, 1}; if N=4, then the index sequence of the TCI states corresponding to the four PDSCHs is {0, 1, 0, 1}; if N=8, then as illustrated in FIG. 4c, the index sequence of the TCI states corresponding to the eight PDSCHs is {0, 1, 0, 1, 0, 1, 0, 1}.

The multiple PDSCHs pool the multiple TCI states and then repeats, therefore can obtain diversity gain of multiple slots or multiple beams in the first few transmission. As such, the terminal can detect the PDSCH faster and the latency of correct transmission can be reduced.

Manner 2: The K TCI states are applied to the N PDSCHs in sequence, that is, the first TCI state is applied to the N PDSCHs, then the second TCI state is applied to the N PDSCHs, and so on, until the K-th TCI state. Specifically, N=m*K(m>1), the n-th PDSCH in the N PDSCHs corresponds to the k-th TCI state in the K TCI states, where k=[n/m]. For example, K=2, then the first TCI state applies to the first half of the multiple PDSCHs and the second TCI state applies to the second half of the multiple PDSCHs.

Figure 4D:
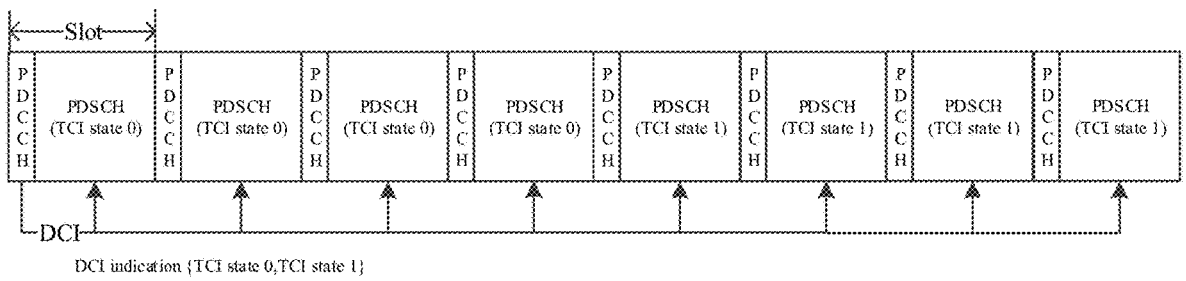
FIG. 4d is diagram illustrating another multi-slot repetition of PDSCH, where N=8.

For example, if N=2, then the index sequence of the TCI states corresponding to the two PDSCHs is {0, 1}; if N=4, then the index sequence of the TCI states corresponding to the four PDSCHs is {0, 0, 1, 1}; if N=8, then as illustrated in FIG. 4d, the index sequence of the TCI states corresponding to the eight PDSCHs is {0, 0, 0, 0, 1, 1, 1, 1}.

If different TCI states can indicate different receive-beams, then the terminal does not have to switch between receive-beams frequently, so the complexity of operations of the terminal can be reduced.

The above Manner 1 and Manner 2 can be used in combination. For example, if N=4, then the index sequence of TCI states corresponding to the four PDSCHs is {0, 1, 1, 0}; if N=8 and K=2, then the index sequence of TCI states corresponding to the eight PDSCHs is {0, 0, 1, 1, 1, 1, 0, 0} or {0, 1, 1, 0, 0, 1, 1, 0}. In this way, both the diversity gain and the receiving beam switching frequency of the terminal are considered, which ensures the diversity gain and low complexity.

At block 407, the terminal detects the multiple PDSCHs according to the TCI state which is applied to each of the multiple PDSCHs.

Suppose a first PDSCH in the multiple PDSCHs corresponds to a first TCI state, and the first TCI state contains QCL Type A and a corresponding CSI-RS resource ID, where the first CSI-RS resource ID indicates a first CSI-RS resource. The terminal assumes that the first PDSCH and a channel through which the signal on the first CSI-RS resource passes have the same Doppler shift, Doppler spread, average delay, and delay expansion. Here, the terminal can adopt the {Doppler shift, Doppler spread, average delay, and delay expansion} used to receive the CSI-RS on the first CSI-RS resource to detect the first PDSCH.

For each of the multiple PDSCHs, detection can be performed by the terminal according to the TCI state of the PDSCH and the operations described above.

Figure 5A:
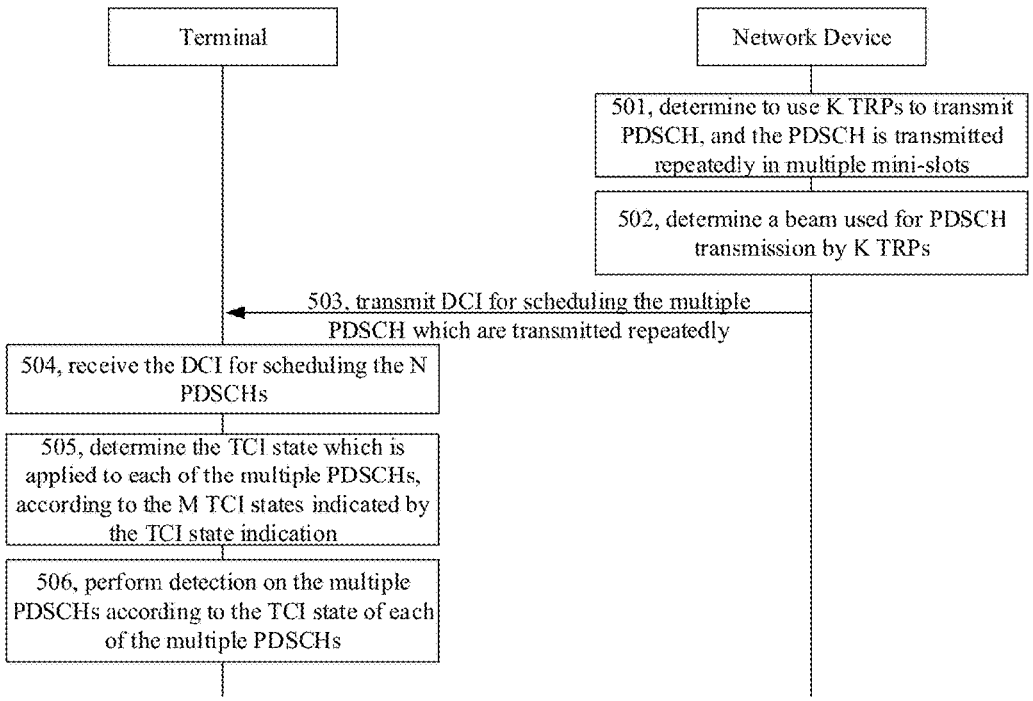
FIG. 5a is a schematic flowchart of another method for downlink data transmission.

FIG. 5a illustrates a method for downlink data transmission, which is applicable to the above communication system and includes the following operations.

At block 501, the network device decides to transmit PDSCH by K TRPs, and repetition of the PDSCH is performed across multiple mini-slots to improve transmission reliability. The number (N) of repetition is notified to the terminal through higher layer signaling, N=2, 4, 8, and K is a positive integer.

At block 502, the network device determines a beam(s) used for transmitting the PDSCH by the K TPRs. The network device can use L beams to transmit the PDSCH on each TRP, therefore, the beam used to transmit the PDSCH by the network device corresponds to M=K*L TCI states, here, the TCI state is determined according to the TRP and the beam.

At block 503, the network device transmits downlink DCI for scheduling multiple PDSCHs which are transmitted repeatedly. The DCI contains TCI state indication for indicating M TCI states, and the multiple PDSCHs carry the same data.

At block 504, the terminal receives the downlink DCI for scheduling the N PDSCHs, where the DCI contains TCI state indication.

Before block 504, the terminal may receive the number (N) of PDSCH repetition which is notified by the network device through RRC signaling. Alternatively, the terminal may determine the number (N) of PDSCH repetition based on the indication in the DCI.

The TCI state indication is for indicating M TCI states form P TCI states indicated by RRC signaling or MAC control element (CE), where P is an integer and P≥M.

Here, in case that the N PDSCHs are transmitted across N PDSCH transmission occasions, one PDSCH transmission occasion may also be referred to as a mini-slot.

In one possible implementation, the multiple PDSCHs occupy the same physical resource across the consecutive PDSCH transmission occasions.

In one possible implementation, each of the consecutive PDSCH transmission occasions occupies the same number of OFDM symbols, and the length of each PDSCH transmission occasion may be less than one slot.

The N consecutive PDSCH transmission occasions may be in one slot, or may across multiple slots.

In one possible implementation, the DCI may indicate the resource location of the first PDSCH transmission occasion, and other transmission occasions occupy the subsequent OFDM symbols in turn.

The method in this implementation is also applicable to consecutive N slots based PDSCH repetition.

The multiple PDSCHs can be transmitted based on the same scheduling information, for example, the same number of transmission layers, the same DMRS port and the same DMRS location, or the same OFDM symbol and the same HARQ process.

At block 505, the terminal determines the TCI state which is applied to each of the multiple PDSCHs according to the M TCI states indicated by the TCI state indication.

Specifically, the terminal determines the TCI sate of each PDSCH from M TCI states according to an index sequence configured by the network device through higher layer signaling. In the following, the number of the multiple PDSCHs is N.

Each index value in the index sequence is used to indicate the index of a TCI state in the M TCI states. The TCI state can be applied to one or more PDSCHs in the multiple PDSCHs.

The index sequence can be indicated in one or more of the following manners.

Manner 1: The length of the index sequence is N, and N TCI states indicated by the index sequence are in one-to-one correspondence with the N PDSCHs. The terminal determines, from the M TCI states, the target TCI state corresponding to the n-th index value in the index sequence as the TCI state of the n-th PDSCH in the N PDSCHs.

For example, M=2 and N=4, the candidate index sequence may be {0, 1, 0, 1}, {0, 0, 1, 1}, {0, 0, 0, 0}, {1, 1, 1, 1}. The network device can inform the terminal of the index sequence used for current PDSCH transmission through higher layer signaling. The terminal determines four TCI states of the four PDSCHs according to the index sequence.

For another example, M=2 and N=8, the candidate index sequence may be {0, 1, 0, 1, 0, 1, 0, 1}, {0, 0, 0, 0, 0, 0, 0, 0}, or {1, 1, 1, 1, 1, 1, 1, 1}.

Manner 2: The length of the index sequence is M, the M TCI states indicated by the index sequence correspond to the N PDSCHs circularly. If N<M, then the first N TCI states indicated by the index sequence can be in one-to-one correspondence with the multiple PDSCHs, and the terminal can determine the TCI states of the N PDSCHs according to the first N TCI states. Specifically, the n-th PDSCH in the N PDSCHs corresponds to a TCI state with index value m in the M TCI states, where m is the k-th index value in the index sequence, and k=[(n−1) mod M+1].

For example, M=2 and N=4, the candidate index sequence can be {0, 1}, {0, 0}, or {1, 1}, and the network device can inform the terminal in advance through higher layer signaling that the index sequence used for the current PDSCH transmission is {0, 1}. As such, the terminal can determine that the index values of TCI states corresponding to N PDSCHs are {0, 1, 0, 1}, and then determine a TCI state of a PDSCH from the M TCI states.

For example, M=3 and N=2, the candidate index sequence can be {0, 1, 2}, {0, 0, 0}, {0, 0, 1}, {0, 1, 1}, or {1, 1, 1}, the network device can inform the terminal in advance through higher layer signaling that the index sequence used for the current PDSCH transmission is {0, 1, 2}. Aa such, the terminal determines that index values of TCI states corresponding to N PDSCHs are {0, 1}, and then determines a TCI state of a PDSCH from the M TCI states.

Figure 5B:
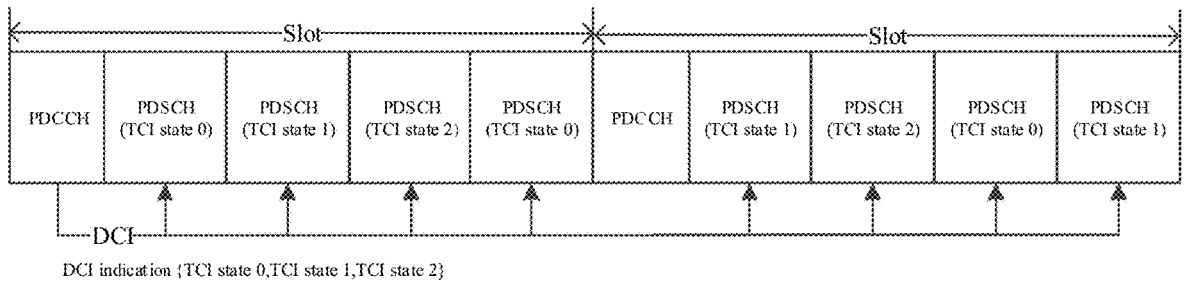
FIG. 5b is a diagram illustrating multi-transmission occasion repetition of PDSCH, where M=3, N=8.

For example, M=3 and N=8, the candidate index sequence can be {0, 1, 2}, {0, 0, 0}, {0, 0, 1}, {0, 1, 1}, or {1, 1, 1}, the network device can inform the terminal in advance through higher layer signaling that the index sequence used for the current PDSCH transmission is {0, 1, 2}. As such, as illustrated in FIG. 5b, the terminal determines that the index values of the TCI states corresponding to the N PDSCHs are {0, 1, 2, 0, 1, 2, 0, 1}, and then determines a TCI state of a PDSCH from the M TCI states.

Manner 3: The length of the index sequence is equal to the fixed value X, and the X TCI states indicated by the index sequence correspond to the N PDSCHs circularly. Here, if N≤X, then the first N TCI states indicated by the index sequence can be in one-to-one correspondence with the multiple PDSCHs, and the terminal can determine the TCI states of the N PDSCHs according to the first N TCI states. Specifically, the n-th PDSCH in the N PDSCHs corresponds to a TCI state with index value m in the X TCI states. m is the k-th index value in the index sequence, and k=[(n−1) mod X+1]. In the following, suppose X=2.

Figure 5C:
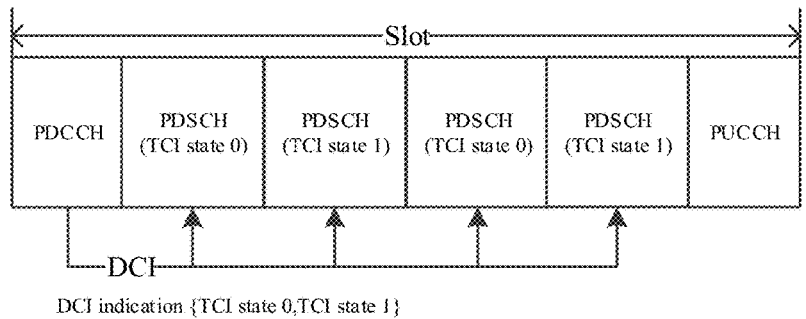
FIG. 5c is a diagram illustrating multi-transmission occasion repetition of PDSCH, where X=3, N=4.

For example, X=2 and N=4, the candidate index sequence can be {0, 1}, {0, 0}, or {1, 1}, the network device can inform the terminal in advance through higher layer signaling that the index sequence used for the current PDSCH transmission is {0, 1}. As such, as illustrated in FIG. 5c, the terminal determines that the index values of the TCI states corresponding to the N PDSCHs are {0, 1, 0, 1}, and then determines a TCI state of a PDSCH from the M TCI states.

For example, X=2 and N=8, the candidate index sequence can be {0, 1}, {0, 0}, or {1, 1}, the network device can inform the terminal in advance through higher layer signaling that the index sequence used for the current PDSCH transmission is {1, 0}. As such, the terminal determines that the index values of TCI states corresponding to N PDSCHs are {1, 0, 1, 0, 1, 0, 1, 0}, and then determines a TCI state of a PDSCH from the M TCI states.

At block 506, the terminal detects the multiple PDSCHs according to the TCI state which is applied to each of the multiple PDSCHs.

Suppose a first PDSCH in the multiple PDSCHs corresponds to a first TCI state, and the first TCI state contains QCL Type B and a corresponding first CSI-RS resource ID as well as QCL Type D and a corresponding second CSI-RS resource ID, where the first CSI-RS resource ID indicates a first CSI-RS resource, and the second CSI-RS resource ID indicates a second CSI-RS resource.

In one possible implementation, the terminal assumes that the first PDSCH and a channel through which the signal on the first CSI-RS resource passes have the same Doppler shift and Doppler spread. Here, the terminal can adopt the Doppler shift and Doppler spread used to receive the CSI-RS on the first CSI-RS resource to detect the first PDSCH. Similarly, the terminal can use the receive-beam used to receive the CSI-RS signal on the second CSI-RS resource to receive the first PDSCH.

For each of the multiple PDSCHs, detection can be performed by the terminal according to the TCI state of the PDSCH and the operations described above.

Figure 6:
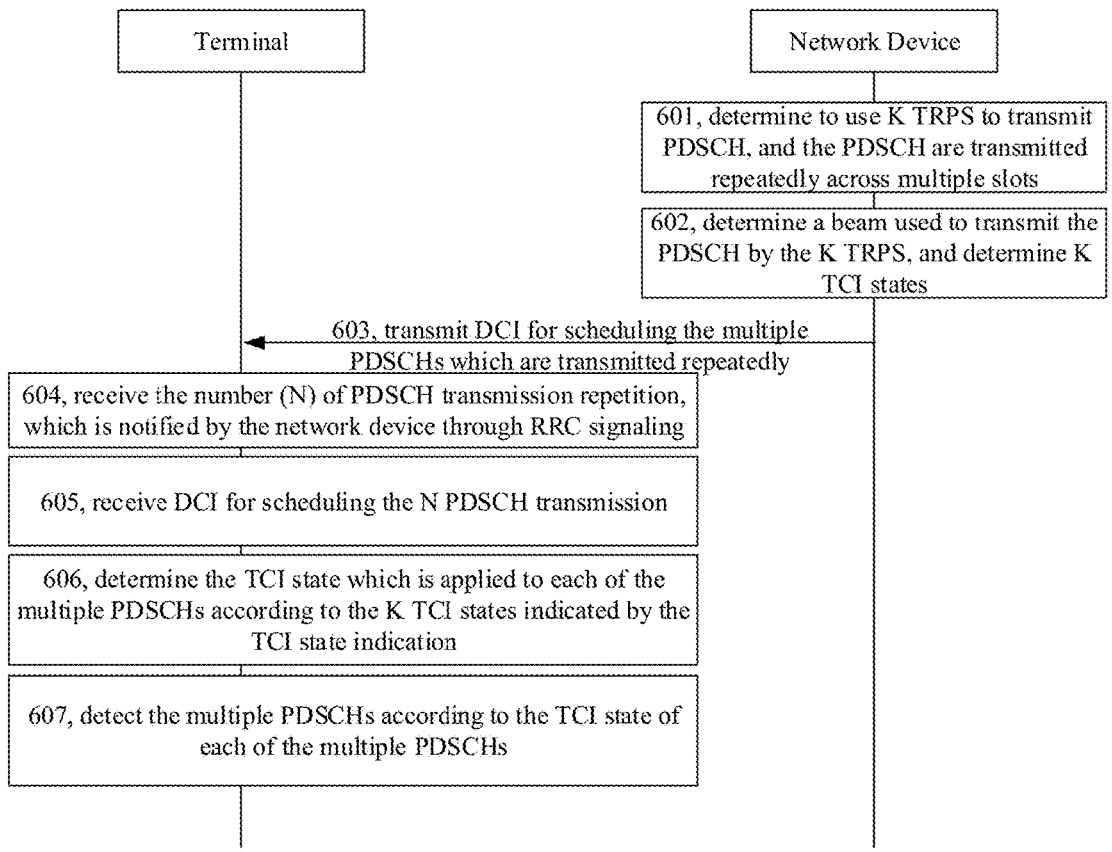
FIG. 6 is a schematic flowchart of another method for downlink data transmission.

FIG. 6 is a method for downlink data transmission. The method is applicable to the above communication system and includes the following operations.

At block 601, the network device decides to transmit PDSCH by K TRPs, and repetition of the PDSCH is performed across multiple slots to improve transmission reliability. The number (N) of repetition is notified to the terminal through higher layer signaling, N=2, 4, 8, and K is a positive integer.

At block 602, the network device determines a beam(s) used for transmitting the PDSCH by the K TPRs and K corresponding TCI states. Here, the TCI states are determined according to the TRP.

AT block 603, the network device transmits downlink DCI for scheduling multiple PDSCHs which are transmitted repeatedly. The DCI contains TCI state indication for indicating the K TCI states.

At block 604, the terminal receives the number (N) of PDSCH repetition which is notified by the network device through RRC signaling.

At block 605, the terminal receives downlink DCI for scheduling the N PDSCH transmissions, the DCI contains TCI state indication for indicating the K TCI states.

Here, suppose the multiple PDSCHs are transmitted across N consecutive slots. The method of this implementation is also applicable to consecutive PDSCH transmission occasions based PDSCH repetition.

At block 606, the terminal determines the TCI state which is applied to each of the multiple PDSCHs according to the K TCI states indicated by the TCI state indication.

Specifically, the terminal determines the TCI state which is applied to each PDSCH from the K TCI states according to the redundancy version configuration(s) of the multiple PDSCHs.

The redundancy version configuration(s) of the multiple PDSCHs can be redundancy version indication(s) contained in the DCI used for scheduling the PDSCH, or can be the actual redundancy version(s) used by the multiple PDSCHs.

Manner 1: The terminal determines an index sequence corresponding to redundancy version indication contained in DCI, and determines the TCI state which is applied to each PDSCH from the K TCI states.

For example, the terminal determines the index sequence according to the value of the redundancy version indication and a correspondence between values of the redundancy version indication and index sequences. The correspondence can be agreed between the terminal and the network device in advance, such as that illustrated in Table. 1, where K=2:

TABLE 1

| Value of the redundancy version indication field in DCI | Index sequence |
|---|---|
| 00 | {0, 0} |
| 01 | {0, 1} |
| 10 | {1, 1} |
| 11 | Reserved |

The redundancy version indication can be used to indicate one of four redundancy version IDs {0, 1, 2, 3}. The terminal determines the index sequence corresponding to the redundancy version ID. The correspondence between values of the redundancy version indication and index sequences can be agreed between the terminal and the network device in advance, such as that illustrated in Table. 2, where K=2:

TABLE 2

| Redundancy version ID indicated by the redundancy version indication | Index sequence |
|---|---|
| 0 | {0, 0} |
| 2 | {0, 1} |

TABLE 2-continued

| Redundancy version ID indicated by the redundancy version indication | Index sequence |
|---|---|
| 3 | {1, 0} |
| 1 | {1, 1} |

The manner in which the TCI state which is applied to each PDSCH is determined according to the index sequence is similar to that of FIG. 5a, and will not be repeated herein again.

Manner 2: The terminal determines the TCI state of the PDSCH according to the redundancy version used by each of the multiple PDSCHs and a correspondence between redundancy versions and TCI states.

The redundancy version used by one PDSCH can be one of {0, 1, 2, 3}.

The correspondence between redundancy versions and TCI states can be agreed between the terminal and the network device in advance, for example, if K=2, then indexes of TCI states corresponding to PDSCHs, which adopt redundancy versions {0, 2, 3, 1}, are respectively {0, 1, 0, 1}, {0, 1, 1, 0}, or {0, 0, 1, 1} in the K TCI states.

At block 607, the terminal performs detection on the multiple PDSCHs according to the TCI state which is applied to each of the multiple PDSCHs.

For example, a first PDSCH in the multiple PDSCHs corresponds to a first TCI state, and the first TCI state contains QCL Type C and a corresponding first SSB index as well as QCL Type D and corresponding first CSI-RS resource ID, the first SSB index indicates the first SSB, and the first CSI-RS resource ID indicates the first CSI-RS resource.

In one possible implementation, the terminal can assume that the first PDSCH and the channel through which the signal on the first SSB passes have the same Doppler shift and average delay. As such, the terminal can detect the first PDSCH by using the Doppler shift and average delay that are used to receive the signal on the first SSB.

The terminal can receive the first PDSCH by adopting the receive-beam that is used to receive the CSI-RS on the first CSI-RS resource.

In this disclosure, for each of multiple PDSCHs, the terminal can perform detection according to the TCI state of the PDSCH and the above methods.

Figure 7:
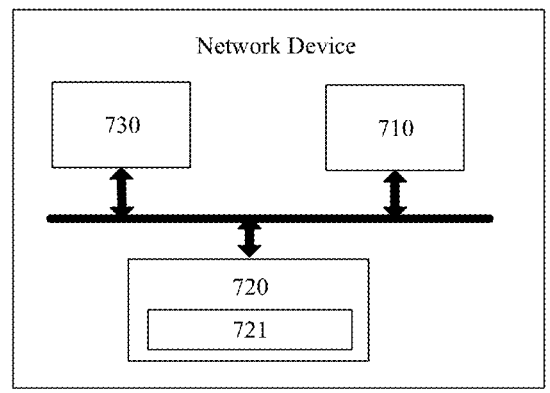
FIG. 7 is a structural diagram illustrating a network device according to implementations.

FIG. 7 is a structural diagram of a network device. As illustrated in FIG. 7, the network device includes a processor 710, a memory 720, a transceiver 730. One and more programs 721 are stored in the memory 720 and are configured to be executed by the processor 710. The programs include instructions for performing the following steps: determining a TCI state which is applied to each of multiple PDSCHs according to at least one of a beam and a TRP used for transmitting each PDSCH.

As such, the terminal can determine the TCI state which is applied to each of multiple PDSCHs (or multiple repetitions of one PDSCH) transmitting the same data from multiple TCI states configured by the network device, and can switch flexibly between multiple TCI states. The communication system can obtain significant diversity gain with less signaling overhead, and the reliability of downlink PDSCH transmission can be improved.

In one possible implementation, in the multiple PDSCHs, PDSCHs transmitted by using different beams or by different TRPs correspond to different TCI states, and/or, PDSCHs transmitted by using a same beam or by a same TRP correspond to a same TCI state.

In one possible implementation, the programs further include instructions for performing the following operations: transmitting DCI for scheduling the multiple PDSCHs, the DCI contains TCI state indication for indicating the TCI state which is applied to each of the multiple PDSCHs, and the multiple PDSCHs carry the same data.

In one possible implementation, the multiple PDSCHs correspond to multiple TCI states.

In one possible implementation, the programs further include instructions for performing the following operations: transmitting the multiple PDSCHs according to the beam or the TRP used for transmitting each of the multiple PDSCHs.

Figure 8:
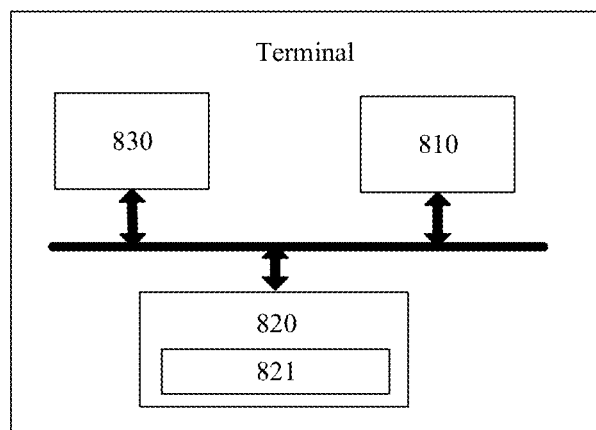
FIG. 8 is a structural diagram illustrating a terminal according to implementations.

FIG. 8 is a structural diagram illustrating a terminal. As illustrated in FIG. 8, the terminal includes a processor 810, a memory 820, and a communication interface 830. One or more programs are stored in the memory 820 and configured to be processed by the processor 810. The programs include instructions for performing the following steps: receiving DCI for scheduling multiple PDSCHs, where the DCI contains TCI state indication; determining the TCI state which is applied to each of the multiple PDSCHs from the at least one TCI state indicated by the TCI state indication.

As such, the terminal can determine the TCI state which is applied to each of multiple PDSCHs (or multiple repetitions of one PDSCH) transmitting the same data from multiple TCI states configured by the network device, and can switch flexibly between multiple TCI states. The communication system can obtain significant diversity gain with less signaling overhead, and the reliability of downlink PDSCH transmission can be improved.

In one possible implementation, the multiple PDSCHs carry the same data. In one possible implementation, the multiple PDSCHs are transmitted across consecutive slots, across consecutive PDSCH transmission occasions, or in a single slot. In one possible implementation, the multiple PDSCHs are transmitted based on at least one of: a same demodulation reference signal (DMRS) port, a same orthogonal frequency division multiplexing (OFDM) symbol, or a same modulation and coding scheme (MCS) and a same hybrid automatic repeat request (HARQ) process. In one possible implementation, the at least one TCI state is multiple TCI states. In one possible implementation, in terms of determining the TCI state which is applied to each of the multiple PDSCHs from at least one TCI state indicated by the TCI state indication, the instructions in the program are configured to perform the following operations: determining the TCI state which is applied to each PDSCH from the at least one TCI state according to a rule agreed with the terminal device.

In one possible implementation, the number of the multiple PDSCHs is N, the number of the at least one TCI state is K, where N and K are positive integers.

The rule includes at least one of: the multiple PDSCHs are in one-to-one correspondence with the at least one TCI state, when N=K; the first N TCI sates in the at least one TCI state correspond to the N PDSCHs, and the N PDSCHs are in one-to-one correspondence with the first N TCI states, when N<K; the n-th PDSCH in the multiple PDSCHs corresponds to the k-th TCI state in the at least one TCI state, and k=[(n−1) mod K+1], when N>K; the n-th PDSCH in the multiple PDSCHs corresponds to the k-th TCI state in the at least one TCI state, and k=[n/m], when N=K*m and m is an integer greater than 1.

In one possible implementation, in terms of determining the TCI state which is applied to each of the multiple PDSCHs from the at least one TCI state indicated by the TCI state indication, the instructions in the program are configured to perform the following operations: determining the TCI state which is applied to each PDSCH from at least one TCI state according to an index sequence configured by the network device through higher layer signaling.

In one possible implementation, each index value in the index sequence is for indicating an index of a TCI state in the at least one TCI state. In one possible implementation, the length of the index sequence is equal to the number of the multiple PDSCHs, and the TCI states indicated by the index sequence are in one-to-one correspondence with the multiple PDSCHs. In terms of determining the TCI state which is applied to each PDSCH from the at least one TCI state according to the index sequence configured by the network device through higher layer signaling, the instructions in the programs are configured to perform the following operations: determining the TCI state which is applied to each PDSCH according to the TCI states indicated by the index sequence and the correspondence between the TCI states and the multiple PDSCHs.

In one possible implementation, the index sequence has a length equal to the number of the at least one TCI state or equal to a fixed value, TCI states indicated by the index sequence correspond to the multiple PDSCHs circularly, or the first N TCI states in the TCI states indicated by the index sequence are in one-to-one correspondence with the multiple PDSCHs, where N is the number of the multiple PDSCHs. In terms of determining the TCI state which is applied to each of the multiple PDSCHs from the at least one TCI state according to the index sequence configured through higher layer signaling, the instructions of the programs are configured to perform the following operations: determining the TCI state which is applied to each of the multiple PDSCHs according to the TCI states indicated by the index sequence and the correspondence between the TCI states and the multiple PDSCHs.

In one possible implementation, the fixed value is 2.

In one possible implementation, the n-th PDSCH in the multiple PDSCHs corresponds to a TCI state with an index value m in the at least one TCI state, wherein m is the k-th index value in the index sequence, k=[(n−1) mod K+1], and K represents the length of the index sequence.

In one possible implementation, in terms of determining the TCI state which is applied to each of multiple PDSCHs from the at least one TCI state indicated by the TCI state indication, the instructions in the programs are configured to perform the following operations: determining the TCI state which is applied to each PDSCH from at least one TCI state according to the redundancy version configuration(s) of the multiple PDSCHs.

In one possible implementation, in terms of determining the TCI state which is applied to each PDSCH from at least one TCI state according to the redundancy version configuration(s) of the multiple PDSCHs, the instructions in the programs are configured to perform the following operations: determining the index sequence corresponding to redundancy version indication contained in the DCI, and determining the TCI state which is applied to each PDSCH from the at least one TCI state according to the index sequence; or determining the TCI state which is applied to each PDSCH according to the redundancy version used by each of multiple PDSCHs and a correspondence between redundancy versions and TCI states.

In one possible implementation, the programs further include instructions for performing the following operations: detecting the multiple PDSCHs according to the TCI state which is applied to each of the multiple PDSCHs.

In one possible implementation, in terms of detecting the multiple PDSCHs according to the TCI state which is applied to each of the multiple PDSCHs, the instructions in the programs are configured to perform the following operations: detecting each of the multiple PDSCHs by detecting large-scale parameters used by a quasi co-location (QCL) reference signal contained in the TCI state which is applied to each of the multiple PDSCHs, according to the QCL reference signal and a QCL type contained in the TCI state which is applied to each of the multiple PDSCHs, wherein the large-scale parameter is a large-scale parameter indicated by the QCL type.

Implementations are mainly introduced from the perspective of interaction between network elements. It is understandable that in order to achieve the above functions, the terminal and network device may include respective hardware structures and/or software modules to perform the respective functions. It is easy for those skilled in the art to realize that in combination with the units and algorithm steps of each implementation described above, the disclosure can be implemented in the form of hardware or a combination of hardware and computer software. Whether a specific function is implemented by hardware or computer software driven hardware depends on the specific application and design constraints of the technical solution. Professional technicians can use different methods to achieve the described functions of each specific application, but such implementation shall not be considered beyond the scope of the disclosure.

Functional units of the terminal and the network device can be divided according to the above method implementations. For example, each functional unit can be divided according to each function, and two or more functions can be integrated into one processing unit. The integrated unit can be realized in the form of hardware or software program module. It should be noted that the division of units in implementations is schematic, which is only a logical function division, and there can be another division mode in actual implementation.

Figure 9:
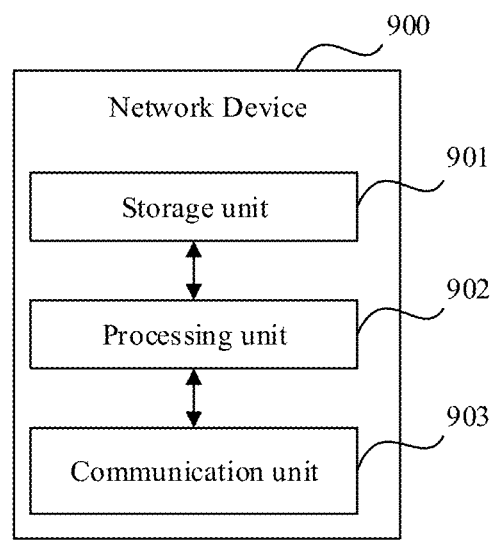
FIG. 9 is a block diagram illustrating functional units of a network device.

In the case of adopting integrated units, FIG. 9 illustrates a possible functional unit block diagram of the network device involved in the above implementation. The network device functions as a first network device. The network device 900 includes a processing unit 902 and a communication unit 903. The processing unit 902 is configured to control and manage actions of the network device. For example, the processing unit 902 is configured to enable the network device to perform step 201 in FIG. 2, steps 401-403 in FIG. 4a, steps 501-503 in FIG. 5a, steps 601-603 in FIG. 6 and/or other processes for implement techniques described herein. The communication unit 903 is configured to enable communication between the network device and other devices, such as the communication between the network device and the terminal. The network device may further include a storage unit 901, which is configured to store program codes and data of the network device.

The processing unit 902 can be a processor or controller, and the communication unit 903 can be a transceiver, a transceiver circuit, a radio frequency (RF) chip, the storage unit 901 can be a memory.

The processing unit 902 is configured to determine a TCI state which is applied to each of multiple PDSCHs according to at least one of a beam and a TRP used for transmitting each PDSCH.

In one possible implementation, in the multiple PDSCHs, PDSCHs transmitted by using different beams or by different TRPs correspond to different TCI states, and/or, in the multiple PDSCHs, PDSCHs transmitted by using a same beam or by a same TRP correspond to a same TCI state.

In one possible implementation, the processing unit 902 is further configured to send DCI for scheduling the multiple PDSCHs through the communication unit 903. The DCI contains TCI state indication for indicting the TCI state which is applied to each of the multiple PDSCHs, and the multiple PDSCHs carry the same data.

In one possible implementation, the TCI state corresponding to the multiple PDSCHs includes multiple TCI states.

In one possible implementation, the processing unit 902 is further configured to transmit the multiple PDSCHs through the communication unit 903 according to the beam or TRP for transmitting each PDSCH.

In case that the processing unit 902 is a processor, the communication unit 903 is a communication interface, and the storage unit is a memory, the network device used herein can be the network device illustrated in FIG. 7.

Figure 10:
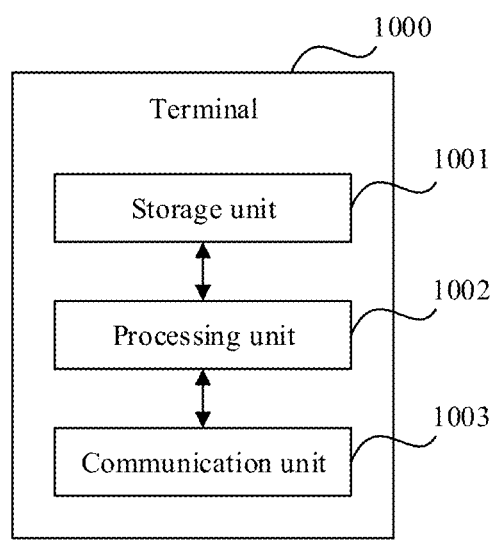
FIG. 10 is a block diagram illustrating functional units of a terminal.

In the case of adopting integrated units, FIG. 10 illustrates a possible functional unit block diagram of the terminal involved in the above implementation. The terminal 1000 includes a processing unit 1002 and a communication unit 1003. The processing unit 1002 is configured to control and manage actions of the terminal. For example, the processing unit 1002 is configured to enable the terminal to perform steps 301-302 in FIG. 3, steps 404-407 in FIG. 4a, steps 504-506 in FIG. 5a, steps 604-607 in FIG. 6 and/or other processes for implement techniques described herein. The communication unit 1003 is configured to enable communication between the terminal and other devices, such as the communication between the network device and the terminal. The network device may further include a storage unit 1001, which is configured to store program codes and data of the terminal.

The processing unit 1002 may be a processor or controller, such as a central processing unit (CPU), a general purpose processor, a digital signal processor (DSP), an application-specific integrated circuit (ASIC), a field programmable gate array (FPGA), or other programmable logic devices, transistor logic devices, hardware components, or any combination thereof. The processing unit 1002 can implement or execute various exemplary logical boxes, modules and circuits described in combination with the contents of the disclosure. The processor may also be a combination of computing functions, for example, including a combination of one or more microprocessor, a combination of DSP and microprocessor, etc. The communication unit 1003 can be a transceiver, a transceiver circuit, etc., and the storage unit 1001 can be memory.

The processing unit 1002 is configured to receive, through the communication unit 1003, DCI for scheduling multiple PDSCHs, where the DCI contains TCI state indication, and determine a TCI state which is applied to each of the multiple PDSCHs according to at least one TCI state indicated by the TCI state indication.

In one possible implementation, the multiple PDSCHs carry the same data. In one possible implementation, the multiple PDSCHs are transmitted across consecutive slots, across consecutive PDSCH transmission occasions, or in a single slot. In one possible implementation, the multiple PDSCHs are transmitted based on at least one of: a same demodulation reference signal (DMRS) port, a same orthogonal frequency division multiplexing (OFDM) symbol, or a same modulation and coding scheme (MCS) and a same hybrid automatic repeat request (HARQ) process. In one possible implementation, the at least one TCI state includes multiple TCI states. In one possible implementation, in terms of determining the TCI state which is applied to each of multiple PDSCHs from at least one TCI state indicated by the TCI state indication, the processing unit 1002 is configured to: determine the TCI state which is applied to each of the multiple PDSCHs from the at least one TCI state according to a rule agreed with a network device. In one possible implementation, the number of the multiple PDSCHs is N, the number of the at least one TCI state is K, N and K are positive integers.

The rule includes at least one of: the multiple PDSCHs are in one-to-one correspondence with the at least one TCI state, when N=K; the first N TCI sates in the at least one TCI state correspond to the N PDSCHs, and the N PDSCHs are in one-to-one correspondence with the first N TCI states, when N<K; the n-th PDSCH in the multiple PDSCHs corresponds to the k-th TCI state in the at least one TCI state, and k=[(n−1) mod K+1], when N>K; the n-th PDSCH in the multiple PDSCHs corresponds to the k-th TCI state in the at least one TCI state, and k=[n/m], when N=K*m and m is an integer greater than 1.

In one possible implementation, in terms of determining the TCI state which is applied to each of multiple PDSCHs from at least one TCI state indicated by the TCI state indication, the processing unit 1002 is configured to: determine the TCI state which is applied to each of the multiple PDSCHs from the at least one TCI state according to an index sequence configured through higher layer signaling. In one possible implementation, each index value in the index sequence is used to indicate the index of one TCI sate in the at least one TCI state. In one possible implementation, the length of the index sequence is equal to the number of the multiple PDSCHs, and the TCI states indicated by the index sequence are in one-to-one correspondence with the multiple PDSCHs. In terms of determining the TCI state which is applied to each of the multiple PDSCHs from the at least one TCI state according to an index sequence configured through higher layer signaling, the processing unit 1002 is configured to: determine the TCI state which is applied to each of the multiple PDSCHs according to the TCI states indicated by the index sequence and the correspondence between index sequences and PDSCHs. In one possible implementation, the length of the index sequence is equal to the number of the at least one TCI state or equal to a fixed value. TCI states indicated by the index sequence correspond to the multiple PDSCHs circularly, or the first N TCI states in the TCI states indicated by the index sequence are in one-to-one correspondence with the multiple PDSCHs, where N is the number of the multiple PDSCHs. In terms of determining the TCI state which is applied to each PDSCH from at least one TCI state according to the index sequence configured by the network device through higher layer signaling, the processing unit 1002 is configured to: determine the TCI state which is applied to each PDSCH according to the TCI state indicated by the index sequence and the correspondence between the index sequences and PDSCHs. In one possible implementation, the fixed value is 2.

In one possible implementation, the n-th PDSCH in the multiple PDSCHs corresponds to a TCI state with index value m in the at least one TCI state, m is the k-th index value in the index sequence, k=[(n−1)mod K+1], K is the length of the index sequence.

In one possible implementation, in terms of determining the TCI state which is applied to each of the multiple PDSCHs from the at least one TCI state indicated by the TCI state indication, the processing unit 1002 is configured to: determine the TCI state which is applied to each of the multiple PDSCHs from the at least one TCI state according to a redundancy version configuration(s) of the multiple PDSCHs.

In one possible implementation, in terms of determining the TCI state which is applied to each of the multiple PDSCHs from the at least one TCI state according to redundancy version configuration(s) of the multiple PDSCHs, the processing unit 1002 is configured to: determine an index sequence corresponding to redundancy version indication contained in the DCI according to the redundancy version indication, and determine the TCI state which is applied to each of the multiple PDSCHs from the at least one TCI state according to the index sequence; or determine the TCI state which is applied to each of the multiple PDSCHs according to a redundancy version used by each of the multiple PDSCHs and a correspondence between redundancy versions and TCI states.

In one possible implementation, the processing unit 1002 is further configured to: detect the multiple PDSCHs according to the TCI state which is applied to each of the multiple PDSCHs.

In one possible implementation, in terms of detecting the multiple PDSCHs according to the TCI state which is applied to each of the multiple PDSCHs, the processing unit 1002 is configured to: detect each of the multiple PDSCHs by detecting large-scale parameters used by a quasi co-location (QCL) reference signal contained in the TCI state which is applied to each of the multiple PDSCHs, according to the QCL reference signal and a QCL type contained in the TCI state which is applied to each of the multiple PDSCHs, where the large-scale parameter is a large-scale parameter indicated by the QCL type.

When the processing unit 1002 is a processor, the communication unit 1003 is a communication interface, and the storage unit 1001 is a memory, the terminal device used herein can be the terminal device illustrated in FIG. 8.

Implementations further provide a computer readable storage medium, which is configured to store computer programs for electronic data exchange, where the computer programs are operable with a computer to perform all or part of the steps in the method performed by the network device or the terminal.

Implementations further provide a computer program product, which includes non-transitory computer readable storage medium storing computer programs. The computer programs are operable with a computer to perform all or part of the steps in the method performed by the network device or the terminal. The computer program product can be implemented as a software installation package.

The steps of the method or algorithm described in implementations of the disclosure can be realized by means of hardware or by means of software instructions executed by the processor. Software instructions can be composed of corresponding software modules, which can be stored in random access memory (RAM), flash memory, read only memory (ROM), erasable programmable read only memory (EPROM), electrically erasable programmable read only memory (EEPROM), register Hard disk, mobile hard disk, CD-ROM or any other form of storage medium well known in the art. An exemplary storage medium is coupled to a processor, such that the processor can read information from the storage medium or write data into the storage medium. Alternatively, the storage medium can be part of the processor. The processor and the storage medium can be located in the ASIC. The ASCI can be located in an access network device, a target network device, or a core network device. The processor and the storage medium can also exist as discrete components in the access network device, the target network device, or the core network device.

All or part of the above implementations can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable medium or data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The specific implementations described above further illustrates the purpose, technical schemes, and beneficial effects of the disclosure. It should be understood that the above is only specific implementations of the disclosure and is not intended to limit the protection scope of the disclosure. Any modification, equivalent replacement, improvement, etc. based on the technical solution of the implementations shall be included in the protection scope of the disclosure.

What is claimed is:

1. A method for downlink data transmission, comprising:
receiving, by a terminal, DCI for scheduling multiple PDSCHs, wherein the DCI contains a TCI state indication; and
determining, by the terminal, a TCI state which is applied to each of the multiple PDSCHs according to at least one TCI state indicated by the TCI state indication;
wherein the multiple PDSCHs are N PDSCHs, the at least one TCI state is K TCI states and K equals to 2; and the K TCI states are applied to the N PDSCHs in circular or in sequence;
under the condition that the multiple PDSCHs are applied to the at least one TCI state in circular:
when $N=K=2$, an index sequence of the TCI states corresponding to the two PDSCHs is $\{0, 1\}$; and
when $N>K=2$, the n-th PDSCH in the multiple PDSCHs corresponds to the k-th TCI state in the at least one TCI state, and $k=[(n-1) \bmod K+1]$.

2. The method of claim 1, wherein under the condition that the multiple PDSCHs are applied to the at least one TCI state in circular:
when $N=4>K=2$, the index sequence of the TCI states corresponding to the four PDSCHs is $\{0, 1, 0, 1\}$; and
when $N=8>K=2$, the index sequence of the TCI states corresponding to the eight PDSCHs is $\{0, 1, 0, 1, 0, 1, 0, 1\}$.

3. The method of claim 1, wherein under the condition that the K TCI states are applied to the N PDSCHs in sequence:
when $N=K=2$, the index sequence of the TCI states corresponding to the two PDSCHs is $\{0, 1\}$; and
when $N=4>K=2$, the index sequence of the TCI states corresponding to the four PDSCHs is $\{0,0,1,1\}$.

4. The method of claim 1, wherein under the condition that the K TCI states are applied to the N PDSCHs in sequence, the n-th PDSCH in the multiple PDSCHs corresponds to the k-th TCI state in the at least one TCI state, and $k=[n/m]$.

5. The method of claim 1, wherein the multiple PDSCHs carry the same data.

6. The method of claim 1, wherein the multiple PDSCHs are transmitted across consecutive slots, across consecutive PDSCH transmission occasions, or in a single slot.

7. The method of claim 1, wherein the multiple PDSCHs are transmitted based on at least one of: a same demodulation reference signal (DMRS) port, a same orthogonal frequency division multiplexing (OFDM) symbol, or a same modulation and coding scheme (MCS) and a same hybrid automatic repeat request (HARQ) process.

8. A terminal, comprising:
a processor;
a transceiver; and
a memory storing one or more programs which, when executed by the processor, are operable with the transceiver to receive DCI for scheduling multiple PDSCHs, wherein the DCI contains TCI state indication, and operable with the processor to determine a TCI state which is applied to each of the multiple PDSCHs according to at least one TCI state indicated by the TCI state indication;
wherein the multiple PDSCHs are N PDSCHs, the at least one TCI state is K TCI states and K equals to 2; and the K TCI states are applied to the N PDSCHs in circular or in sequence;
under the condition that the multiple PDSCHs are applied to the at least one TCI state in circular:
when $N=K=2$, an index sequence of the TCI states corresponding to the two PDSCHs is $\{0, 1\}$; and
when $N>K=2$, the n-th PDSCH in the multiple PDSCHs corresponds to the k-th TCI state in the at least one TCI state, and $k=[(n-1) \bmod K+1]$.

9. The terminal of claim 8, wherein under the condition that the multiple PDSCHs are applied to the at least one TCI state in circular:
when $N=4>K=2$, the index sequence of the TCI states corresponding to the four PDSCHs is $\{0, 1, 0, 1\}$; and
when $N=8>K=2$, the index sequence of the TCI states corresponding to the eight PDSCHs is $\{0, 1, 0, 1, 0, 1, 0, 1\}$.

10. The terminal of claim 8, wherein under the condition that the K TCI states are applied to the N PDSCHs in sequence:
when $N=K=2$, the index sequence of the TCI states corresponding to the two PDSCHs is $\{0, 1\}$; and when N=4>K=2, the index sequence of the TCI states corresponding to the four PDSCHs is {0,0,1, 1}.

11. The terminal of claim 8, wherein under the condition that the K TCI states are applied to the N PDSCHs in sequence, the n-th PDSCH in the multiple PDSCHs corresponds to the k-th TCI state in the at least one TCI state, and k=[n/m].

12. The terminal of claim 8, wherein the multiple PDSCHs carry the same data.

13. The terminal of claim 8, wherein the multiple PDSCHs are transmitted across consecutive slots, across consecutive PDSCH transmission occasions, or in a single slot.

14. The terminal of claim 8, wherein the multiple PDSCHs are transmitted based on at least one of: a same demodulation reference signal (DMRS) port, a same orthogonal frequency division multiplexing (OFDM) symbol, or a same modulation and coding scheme (MCS) and a same hybrid automatic repeat request (HARQ) process.

15. A network device, comprising:
   a processor;
   a transceiver; and
   a memory storing one or more programs which, when executed by the processor, are operable with the transceiver to:
   determine a TCI state which is applied to each of the multiple PDSCHs according to at least one TCI state indicated by the TCI state indication;
   send DCI for scheduling multiple PDSCHs, wherein the DCI contains a TCI state indication;
   wherein the multiple PDSCHs are N PDSCHs, the at least one TCI state is K TCI states and K equals to 2; and the K TCI states are applied to the N PDSCHs in circular or in sequence;
   under the condition that the multiple PDSCHs are applied to the at least one TCI state in circular:
      when N=K=2, an index sequence of the TCI states corresponding to the two PDSCHs is {0, 1}; and
      when N>K=2, the n-th PDSCH in the multiple PDSCHs corresponds to the k-th TCI state in the at least one TCI state, and k=[(n−1) mod K+1].

16. The network device of claim 15, wherein under the condition that the multiple PDSCHs are applied to the at least one TCI state in circular:
   when N=4>K=2, the index sequence of the TCI states corresponding to the four PDSCHs is {0, 1, 0, 1}; and
   when N=8>K=2, the index sequence of the TCI states corresponding to the eight PDSCHs is {0, 1, 0, 1, 0, 1, 0, 1}.

17. The network device of claim 15, wherein under the condition that the K TCI states are applied to the N PDSCHs in sequence:
   when N=K=2, the index sequence of the TCI states corresponding to the two PDSCHs is {0, 1}; and
   when N=4>K=2, the index sequence of the TCI states corresponding to the four PDSCHs is {0,0,1, 1}.

18. The network device of claim 15, wherein under the condition that the K TCI states are applied to the N PDSCHs in sequence, the n-th PDSCH in the multiple PDSCHs corresponds to the k-th TCI state in the at least one TCI state, and k=[n/m].

19. The network device of claim 15, wherein the multiple PDSCHs carry the same data.

20. The network device of claim 15, wherein the multiple PDSCHs are transmitted across consecutive slots, across consecutive PDSCH transmission occasions, or in a single slot.

* * * * *